Feb. 1, 1938. G. CHRISTENSON 2,106,829
PACKING ASSEMBLY
Filed March 27, 1935

INVENTOR.
George Christenson.
BY D. N. Halstead.
ATTORNEY.

Patented Feb. 1, 1938

2,106,829

UNITED STATES PATENT OFFICE 2,106,829

PACKING ASSEMBLY

George Christenson, Plainfield, N. J., assignor to Johns-Manville Corporation, New York, N. Y., a corporation of New York Application March 27, 1935, Serial No. 13,209

2 Claims. (Cl. 309—34)

This invention relates to a packed assembly and particularly to one adapted for use in the cylinder of an airbrake.

Airbrakes used in large numbers have each a piston and a cylinder of relatively large area of cross section, and require, therefore, a large amount of packing material to maintain the proper fluid-tight seal between the face of the piston and the wall of the cylinder, as the piston moves therein. It has been customary, heretofore, to obtain this desired sealing by use of a sheet packing extending completely over the face of the piston. Also, the packing is sometimes held in position by through-bolts.

The present invention comprises means of obtaining the proper seal while, at the same time, greatly reducing the amount of relatively expensive packing material that must be used. Furthermore, the invention comprises means for holding the outside of a ring of even small area of cross section in good packing contact with the inside of the cylinder wall, without perforating the packing.

Other objects and advantages of the invention will appear from the detailed description that follows.

Figure 1:
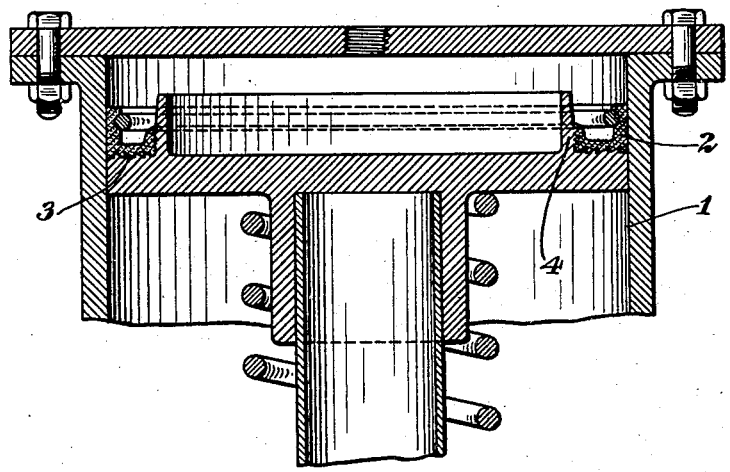
Figure 2:
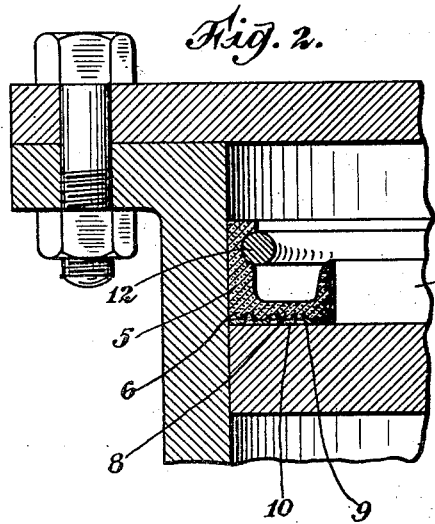
Figure 3:
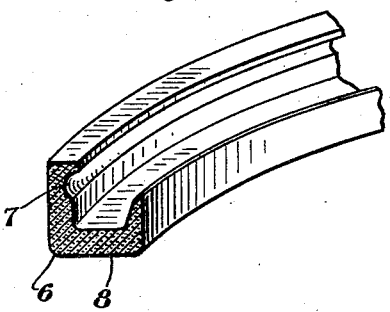

A preferred embodiment of the invention will be described in connection with the drawing in which Fig. 1 shows a longitudinal sectional view of a portion of an airbrake cylinder including my improved packing assembly;

Fig. 2 shows a longitudinal sectional view, on a somewhat enlarged scale as compared with Fig. 1, of a side portion of an airbrake having a modified packing assembly; and Fig. 3 shows a form of packing ring suitable for use in the structures illustrated in Figs. 1 and 2.

Thus there are shown a surface 1, in this case the inside wall of a cylinder of an airbrake, a packing element 2 disposed within the cylinder and a support for the packing, including, for example, the piston face extending approximately at a right angle to the surface to be packed and provided on the peripheral portion of the said face with upstanding irregularities of surface 3 constituting teeth penetrating and engaging the said packing and holding it in packing contact with the interior surface of the wall of the cylinder.

The packing element may consist of a rubber packing composition or the like. It should be resilient and relatively penetrable, so that, when the packing is pressed down upon the irregularities of surface, the irregularities will come to extend into the packing material and will thus hold the packing material properly against the surface that is to be packed.

The upright flange 5 is united to the base portion 8 of the packing at position 6 and is provided with a groove 7 (Figs. 2 and 3) in which there is engaged a metal expander ring 12 such as a circular rod of steel of the proper hardness. Positioning the groove toward the inside upper part of the flange, remote from the position 6 of union between the flange and the base member, gives a leverage action to the steel spring member, which, therefore, causes firm packing contact between the upper portion of the flange of the packing member and the cylinder wall.

Details of the packing are shown in Fig. 3, illustrating a portion of the annular element adapted for use as the packing shown in Fig. 1 or Fig. 2.

The annular packing support of L-shaped cross section, shown in Fig. 2, may be provided with surface irregularities 9 in both the base 10 and the flange 11 upstanding therefrom. The irregularities may be perforations into which the resilient, penetrable packing composition seats itself as the packing is forced downward against the irregularities. The result is a locking or keying of the packing in position, while the packing is in a penetrable and preferably incompletely hardened condition.

From the embodiment shown in Fig. 1, it will be noted that the irregularities of surface slope in an outwardly direction towards the surface to be packed, thus adapting the teeth or other irregularities on the surface to hold the packing against displacement in direction away from the surface packed.

The piston face may be provided with alignment members 4, extending at spaced intervals, suitably completely, around the piston face at its side portion. These, or the flange 11 of the support shown in Fig. 2, may each be provided on their surface with irregularities engaging the packing and holding the same against being raised from the support.

What I claim is:

1. An assembly including a cylinder wall of regular surface, a piston in contact at its periphery with the said wall and movable within the cylinder, and an annular packing element supported by the portion of the piston adjacent to the periphery thereof and in packing contact with the inside of the cylinder wall, the said packing element including a resilient and penetrable packing composition in annular form and the portion of the piston supporting the packing being provided with teeth penetrating into and engaging the packing composition, said teeth constituting the sole positive connecting means between the packing element and piston.

2. An assembly including a cylinder wall of regular surface, a piston in contact at its periphery with the said wall and movable within the cylinder, and an annular packing element supported by the portion of the piston adjacent to the periphery thereof and in packing contact with the inside of the cylinder wall, the said packing element including a resilient and penetrable packing composition in annular form, the portion of the piston supporting the packing element being provided with upwardly extending prongs penetrating into and engaging the packing composition, and the said teeth sloping in upward direction towards the cylinder wall, said teeth constituting the sole positive connecting means between the packing element and piston.

GEORGE CHRISTENSON.